Jan. 21, 1969  T. G. GREGORY  3,423,500
METHOD FOR INSPECTING INACCESSIBLE SURFACES
Filed Jan. 28, 1966

INVENTOR.
Thomas G. Gregory
BY

United States Patent Office 3,423,500
Patented Jan. 21, 1969

3,423,500
METHOD FOR INSPECTING INACCESSIBLE SURFACES
Thomas G. Gregory, Los Alamos, N. Mex., assignor to the United States of America as represented by the United States Atomic Energy Commission
Filed Jan. 28, 1966, Ser. No. 523,803
U.S. Cl. 264—220
Int. Cl. G01b *13/22;* B29d *23/03*
4 Claims

ABSTRACT OF THE DISCLOSURE

The method for inspecting the surface characteristics of an otherwise inaccessible cavity comprising inserting a plastic bladder of polyvinyl chloride, heating the article containing the cavity to be inspected to above the memory temperature of the bladder, pressurizing the bladder into firm contact with the walls of the cavity, cooling the body containing the cavity to be inspected to below the memory temperature of the bladder, evacuating the bladder, extracting the bladder and inspecting the surface of the bladder.

---

The invention described herein was made in the course of, or under, a contract with the U.S. Atomic Energy Commission.

The present invention relates to a method for determining the character of a surface which is inaccessible to direct optical or instrument inspection.

There are situations in which the smoothness, or continuity of the internal surface of a small bore tube or a cavity accessible through only a small bore port must be determined with high precision. In nuclear reactors for example, the coolant passages through fuel elements are frequently coated with niobium to prevent erosion, and the integrity of such a coating is not determinable with old art inspection methods. Another example is in small diameter metal ducts which carry corrosive substances like acids or dissolving-substances such as molten sodium. Such ducts are frequently provided with a thin plating which is resistant or immune to the deleterious substance. The slightest imperfection in the plating inevitably results in failure of the duct.

It is, therefore, a primary objective of the present invention to provide a method for inspecting the internal surfaces of ducts, cavities and the like.

To achieve the desired result I have provided a novel technique which employs the "memory" of a suitable plastic material after a heating and cooling cycle.

One example of the employed technique was the insertion of a polyvinyl tube into the bore of the object to be inspected, pressurizing the polyvinyl tube to 40 p.s.i. with argon gas and heating the object and polyvinyl tube to about 140° C. The polyvinyl tube inflates against the surface of the bore of the object and "forgets" its previous shape when so heated. The assembly is cooled with the polyvinyl tube remaining pressurized so that the polyvinyl "remembers" the shape and surface configurations of the bore surface. The tube is removed by releasing the gas pressure and stretching the tube from both ends to reduce its diameter sufficiently to permit withdrawal.

The object having the bore or cavity to be inspected is preferably heated with a temperature profile highest at the location of the bore or cavity most remote from the outside and decreasing toward the outside to eliminate air bubble entrapment between the adjacent surfaces.

After the process above-mentioned is completed, the polyvinyl material provides an excellent replica of the surface of interest. If photographs of the surface configuration are to be taken, a vacuum evaporator may be used to deposit a thin film of chromium on the replica to enhance the fine detail.

An alternative solution to air entrapment problems is to use a vacuum furnace which permits the evacuation of essentially all the gas between the surfaces of the bladder and cavity before the bladder is expanded under pressure against the cavity wall.

In order that the procedure followed in making inspections according to the present invention may be better comprehended, reference is made to the accompanying drawing in which.

Figure 1:
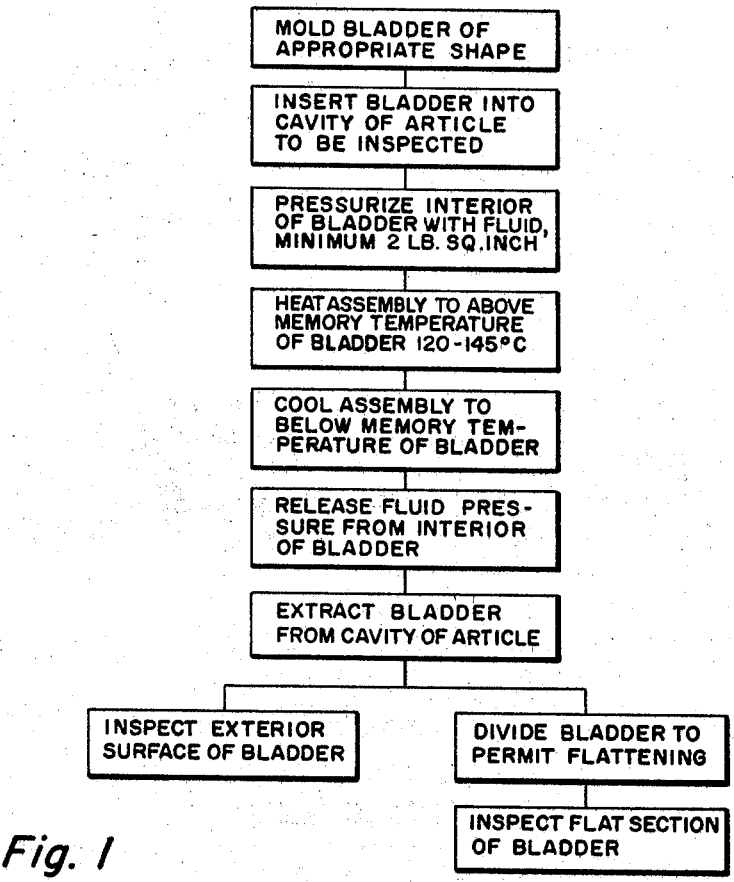
FIGURE 1 is a flow sheet showing diagrammatically the several steps of my method.

Referring to the flow sheet of FIGURE 1, the first step of my method is the preparation by molding of a bladder having an initial size such that when heated and pressurized it can expand without rupture to the surface of the cavity being inspected. In the case of inspecting the interior of tubes, ducts, and the like, ordinary closed-end plastic tubing of the correct chemical nature and cross-sectional perimeter is naturally suited. But where there is an enlarged cavity reachable only through a small elongated tube as in FIGURE 2, the bladder should be given a compatible size. It should be noted that the bladder as fabricated is preferably not given the actual shape of an enlarged cavity but is given compatible size, and is preferably molded into a folded flat or rolled compact which is readily passed through the access tube.

The particular compound to be utilized for the bladder must have certain requisite characteristics. It must have excellent memory retention of its configuration when last cooled from an above-memory temperature. It must be strong and temporarily deformable at room temperature. It must be nonsticky at above-memory temperature so that it will not adhere to the body being inspected but instead can be readily detached therefrom. In the present state of the plastics art I have found but one material, polyvinyl chloride, which has all of the requisite characteristics.

The next step in my method is to pressurize the interior of the bladder. I have found pressures as low as 2 pounds per square inch effective but higher pressures such as 40 pounds per square inch result in better imprints of minute imperfections. Consequently, I prefer a higher pressure than 2 pounds per square inch, the pressure having an upper limit determined only by the strength of the object being inspected.

Next, the article having the interior surface to be inspected, with the pressurized bladder in place is heated to above the memory transition temperature of the polyvinyl chloride bladder. This temperature preferably lies within the range of 120 to 145 degrees centigrade. Next, the assembly of article and bladder are cooled to below the memory transition temperature.

Next, the bladder is depressurized. In some configurations of cavities, I find it helpful to apply a vacuum pump to the bladder to effect total compaction to facilitate the next step.

The next step in the method is the withdrawal of the bladder from the cavity. In this step the tensile strength and toughness of polyvinyl chloride is indispensable because considerable force may be required. The deformation of the bladder due to stretching in withdrawal is totally erased in a short while at ambient temperature due to the excellent memory retention qualities of this material.

The final step is the inspection of the bladder surface and it is frequently desirable to cut the bladder into small sections for insertion in a microscope stage for high resolution examination.

Figure 2:
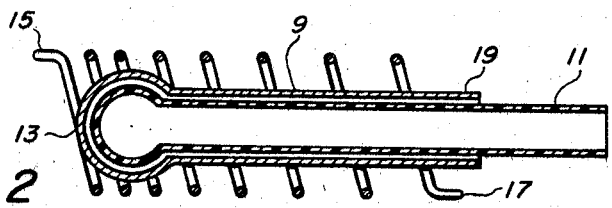
FIGURE 2 is a view in cross section of an article having an internal cavity surface to be inspected and the bladder in position to acquire an imprint of said surface.

An apparatus set-up is shown in FIGURE 2. Bladder 11 has been inserted in article 9. The portion at and proximate the closed end 13 of the article 9 and bladder 11 is heated more rapidly than the rest of the assembly to permit the progressive expansion of the bladder starting at the blind end of the cavity in article 19 to avoid entrapment of air. The heating element 15–17 is shown progressively more concentrated toward closed end 13 from open end 19. Electrical energy is applied to heating element 15–17 until all of the portion of the bladder intended to acquire the replica is heated above 120° centigrade.

This method provides a resolution of approximately 50 angstroms and is therefore capable of indicating exceedingly small imperfections and pin holes in the inspected surface. This method provides a much needed and indispensable tool for the examination of otherwise inaccessible surfaces. The invention is not limited to the specific examples described herein with respect to shape, pressure, or material, provided other materials may be discovered or invented which are equivalent to polyvinyl chloride in necessary characteristics. In the case of quite large cavities relative to the size of the access port, a plurality of bladders may be simultaneously utilized so that insertion and withdrawal may be facilitated by sequential insertion and withdrawal.

What is claimed is:

1. The method for examining the interior surface of a hollow article which comprises the steps of molding a plastic bladder to a shape compatible with the shape of the interior surface, inserting the bladder into the article, pressurizing the bladder, heating the article with the bladder in place to above the memory transition temperature of the bladder, cooling the article with the pressurized bladder in place to below the memory transition temperature, releasing the pressure from the bladder, and extracting the bladder from the article for external examination.

2. The method of claim 1 in which the plastic bladder is made of polyvinyl chloride.

3. The method of claim 1 in which the bladder is evacuated prior to extraction of the bladder.

4. The method of claim 1 in which heating is initially greatest at the innermost portion of the bladder and progresses from the innermost portion to the outside.

References Cited

UNITED STATES PATENTS

| | | | |
|---|---|---|---|
| 2,618,014 | 11/1952 | Sawyer et al. | 264—291 |
| 2,793,399 | 5/1957 | Gallay et al. | 264—225 |
| 3,046,601 | 7/1962 | Hubbert et al. | 264—220 |
| 3,227,154 | 1/1966 | Cook | 264—220 |

ROBERT F. WHITE, *Primary Examiner.*

J. R. THURLOW, *Assistant Examiner.*

U.S. Cl. X.R.

264—230, 27, 327